No. 654,476. Patented July 24, 1900.
A. MOELLER.
SPRINKLING APPARATUS.
(Application filed Feb. 20, 1900.)
(No Model.) 2 Sheets—Sheet 1.
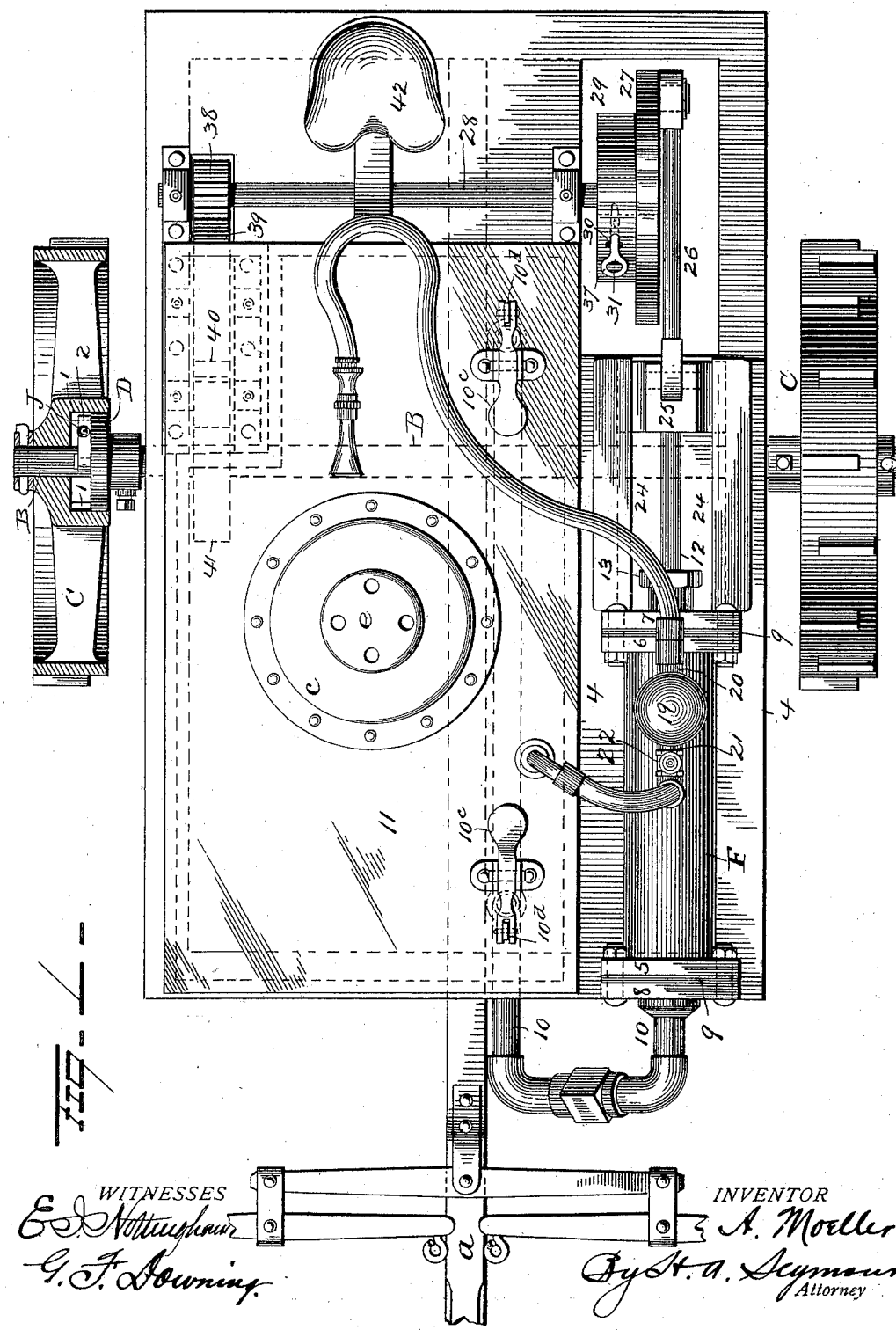

No. 654,476. Patented July 24, 1900.
A. MOELLER.
SPRINKLING APPARATUS.
(Application filed Feb. 20, 1900.)
(No Model.) 2 Sheets—Sheet 2.
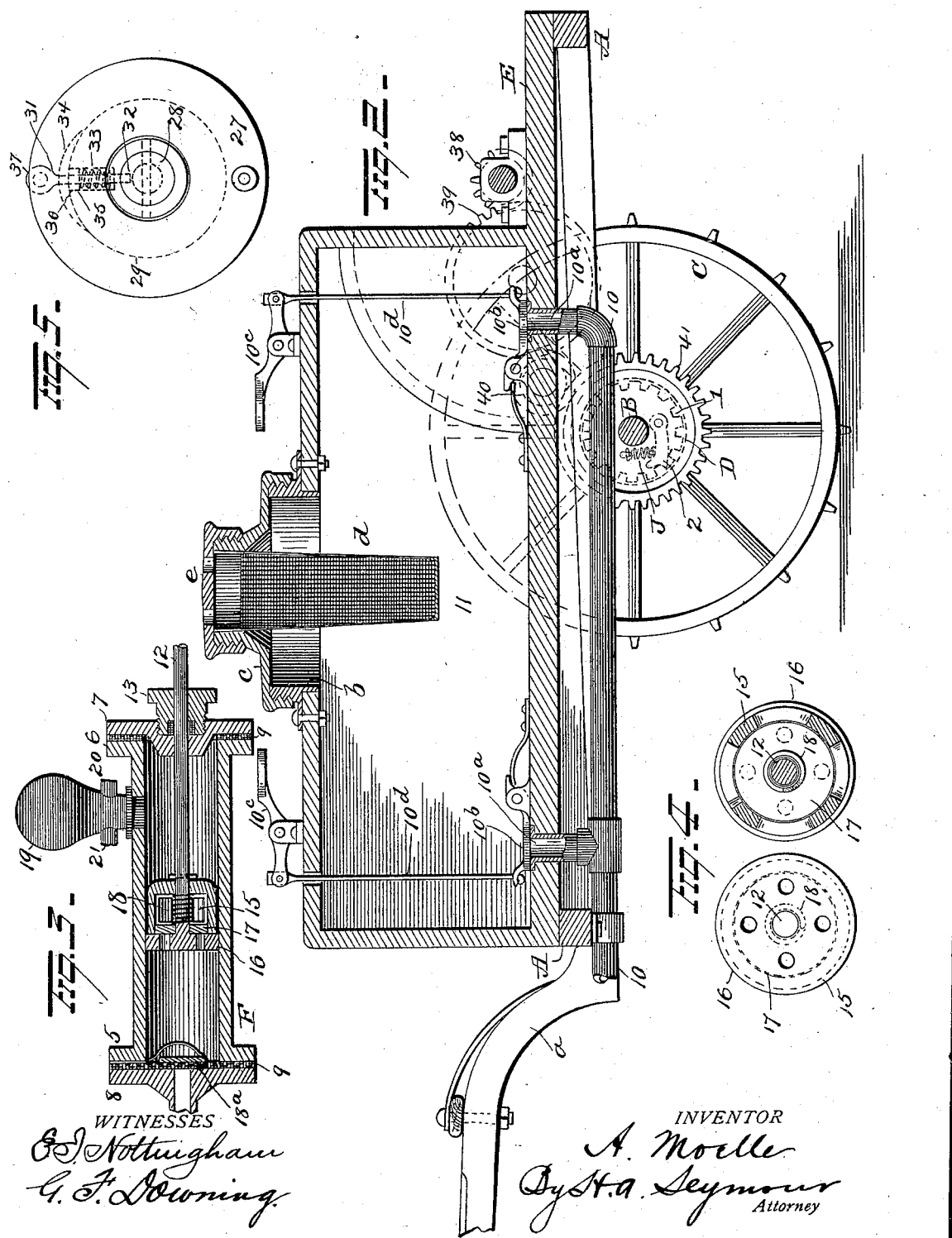
WITNESSES
INVENTOR
A. Moeller
By H. A. Seymour
Attorney

UNITED STATES PATENT OFFICE.

ANDREW MOELLER, OF FERN RIDGE, MISSOURI.

SPRINKLING APPARATUS.

SPECIFICATION forming part of Letters Patent No. 654,476, dated July 24, 1900.

Application filed February 20, 1900. Serial No. 5,937. (No model.)

*To all whom it may concern:*

Be it known that I, ANDREW MOELLER, a resident of Fern Ridge, in the county of St. Louis and State of Missouri, have invented certain new and useful Improvements in Sprinkling Apparatus; and I do hereby declare the following to be a full, clear, and exact description of the invention, such as will enable others skilled in the art to which it appertains to make and use the same.

My invention relates to an improvement in spraying or watering apparatus, one object of the invention being to provide a simple and efficient apparatus for carrying water and sprinkling it on trees, plants, vines, &c.

A further object is to so construct the apparatus that it can be conveniently used by farmers, gardeners, &c., and so that it can be readily transported over fields, gardens, or orchards and act automatically as it moves along to force water from a tank carried by the machine through suitable outlets to plants, trees, &c., to be watered.

A further object is to construct a watering apparatus which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a plan view of my improved apparatus. Fig. 2 is a view in longitudinal section of the same, and Figs. 3, 4, and 5 are views illustrating various details.

A represents a frame or truck provided at its forward end with a tongue $a$ and suitable devices for the attachment of horses, preferably two. The frame or truck A is provided between its ends with suitable bearings for a revoluble axle B, the ends of which project suitable distances from the frame or truck to accommodate the carrying-wheels C C and disks D D. The wheels C C are mounted loosely on the axle, and each is made with a central internally-toothed portion 1, which constitutes, in effect, a ratchet-wheel. The disks D are fixed to the axle by means of suitable keys or in any other desired manner and carry pivoted dogs 2, which coöperate with the toothed portions of the carrying-wheels, being normally retained in engagement therewith by means of springs J. From this construction and arrangement of parts it will be seen that when the machine is moved forwardly the axle will turn with the wheels, but that should the machine be moved backwardly motion would not be imparted to the axle, as the dogs 2 would in such case ride freely over the teeth 1 in said carrying-wheels.

A platform E is located on the truck or frame A, and on said platform at one side thereof parallel bars 4 are located. These bars serve to support a pump-cylinder F, having integral annular flanges 5 6 at its respective ends. To the respective flanges 5 6 heads 7 8 are bolted, and between said flanges and heads or plates suitable washers 9 are disposed. The head or plate 8 is made with a suitable opening for the accommodation of a pipe 10, and suitable packing is provided for this pipe. The other end of the pipe 10 is disposed beneath and communicates with a tank 11 (located on the truck) at points near its forward and rear ends by means of short pipes $10^a$, provided with valves $10^b$, normally closed. A lever $10^c$ is provided on each end of the tank and is connected with the valve by a rod $10^d$, so that when the spraying-machine is running on level ground either one or both of said valves may be opened; but when going downhill the contents of the tank will rush forward and the front valve should be opened, while when going uphill the contents of the tank will rush to the rear thereof and it will be necessary to open the rear valve and permit the forward valve to close.

The tank 10 is provided in its top with an opening, having a threaded collar $b$ around the same for the reception of a threaded ring $c$, carrying a downwardly-projecting conical screen $d$, preferably of wire-gauze, to prevent any entrance of rubbish or foreign matter to the tank when the same is being filled. A perforated cover $e$ is provided on said screened portion $d$ to prevent the liquid from splashing out, but at the same time allow the free passage of air therethrough to permit the feeding of the liquid to the pump.

The head 7 of the pump-cylinder is made with a hole for the passage of the piston-rod 12 and is also adapted to receive packing for said piston-rod. A portion of said opening in the head 7 is threaded for the reception of a screw 13, adapted to bear against said packing and having a hole for the passage of the piston-rod. The piston 14, attached to said piston-rod within the pump-cylinder, comprises a cage 15, through which the piston-rod passes, and one end of said cage is provided with a perforated plate 16, to which the end of said piston-rod is secured. A plate or disk 17 is mounted loosely on the piston-rod within the cage and adapted to close the perforations in the plate, said disk being normally held in contact with the plate 16 by means of a spring 18. A valve $18^a$ is provided in the end of the cylinder and prevents the return of water to the tank. The pump-cylinder is provided at one end with a small dome 19, with which two pipes 20 21 communicate. Both of these pipes may have sections of hose attached to them, so that plants, &c., at both sides of the apparatus can be watered simultaneously; but in most cases I prefer to provide the pipe 21 with a valve 22 and connect said pipe with the water-tank. By regulating the flow of water through the pipe 21 and back to the tank the pressure or force of water through the pipe 20 can be readily regulated.

A grooved plate 24 is located on the bars 4 for the reception and guidance of the crosshead 25, to which the piston-rod is attached. The cross-head 25 is bifurcated for the reception of one end of a pitman 26, the other end of which is connected with a crank-disk 27, secured to a shaft 28, the latter being mounted in suitable bearings on the platform. The crank-disk is made with a central enlargement 29, having a hole 30 for the reception of a pin 31, the inner end of which is adapted to enter a hole 32 in the shaft 28 and be normally retained therein by means of a spring 33. The spring 33 is prevented from escape by means of a block 34, secured to the periphery of the enlargement 29, said block having a projection 35 to enter the hole 30 and receive the outer end of the spring. The outer end of the pin 31 is preferably provided with a knob or handle 37, whereby to detach it from the shaft 28 when it is desired to throw the pump out of action.

A pinion 38 is secured to the shaft 28 and receives motion from a larger pinion or gear-wheel 39, having its journals mounted in suitable bearings on the platform. The pinion or gear-wheel 39 receives motion from a smaller pinion or gear-wheel 40, having its journals mounted in suitable bearings on the truck, and the pinion 40 receives motion from a smaller pinion 41, secured to the axle of the machine. From this construction and arrangement of parts it will be seen that when the machine is moved forwardly motion will be transmitted from the axle through the gearing above described to the pump-piston, resulting in causing water to flow from the tank into the cylinder of the pump and then forced out through the outlets 20 21.

Any approved seat 42 may be provided at the rear of the machine for the driver or operator.

My improvements are simple in construction and are effectual in all respects in the performance of their functions.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a sprinkling apparatus, the combination with a tank and a pump disposed in proximity thereto, of a pipe connected with said pump and disposed beneath the tank, tubes connecting the pipe with the front and rear ends of said tank, valves for said tubes, and means on said tank for operating said valves.

2. In a sprinkling apparatus, the combination with a vehicle, a tank thereon, a pump on said vehicle and means for operating the pump, of a pipe disposed beneath the tank and communicating with the pump, an outlet for said tank at the front and rear thereof communicating with said pipe, valves in said outlets normally closed, levers on top of said tank at the front and rear ends thereof, fulcrumed between their ends and rods connecting one end of said levers with the valve below the same.

3. In a sprinkling apparatus, the combination with a vehicle, of a tank having outlets in its bottom near its respective ends, a valve for each outlet, means for independently operating said valves, a pump connected with said pipe and means connected with said pump for distributing liquid.

In testimony whereof I have signed this specification in the presence of two subscribing witnesses.

ANDREW MOELLER.

Witnesses:
JOHN J. BRAUN,
WM. W. RAVENS.